(12) United States Patent
Mestery et al.

(10) Patent No.: US 12,095,665 B2
(45) Date of Patent: Sep. 17, 2024

(54) NETWORK ADDRESS TRANSLATION (NAT)-BASED TRAFFIC STEERING

(71) Applicant: Cisco Technology, Inc., San Jose, CA (US)

(72) Inventors: Kyle Andrew Donald Mestery, Woodbury, MN (US); Vincent E. Parla, North Hampton, NH (US); Ian James Wells, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 272 days.

(21) Appl. No.: 17/572,320

(22) Filed: Jan. 10, 2022

(65) Prior Publication Data

US 2023/0224248 A1 Jul. 13, 2023

(51) Int. Cl.
*H04L 45/74* (2022.01)
*H04L 69/165* (2022.01)

(52) U.S. Cl.
CPC ............ *H04L 45/74* (2013.01); *H04L 69/165* (2013.01)

(58) Field of Classification Search
USPC ....................................................... 370/389
See application file for complete search history.

(56) References Cited

U.S. PATENT DOCUMENTS

| | | | |
|---|---|---|---|
| 7,227,872 B1 * | 6/2007 | Biswas | H04L 61/2532 370/465 |
| 10,924,456 B1 | 2/2021 | Moore et al. | |
| 2014/0298415 A1 * | 10/2014 | Xie | H04L 61/2575 726/3 |
| 2016/0294646 A1 * | 10/2016 | Kirner | H04L 41/0893 |
| 2019/0386880 A1 | 12/2019 | Dhanabalan et al. | |
| 2021/0234720 A1 * | 7/2021 | Shribman | G06F 9/4555 |
| 2021/0273916 A1 | 9/2021 | Neystadt et al. | |

(Continued)

OTHER PUBLICATIONS

Srisuresh, P., et al., "Load Sharing using IP Network Address Translation (LSNAT)"; Internet Engineering Task Force, IETF; Standard, Internet Society (ISOC) 4, Rue Des Falaises CH-1205 GE:t-1:EVA, Switzerland, Aug. 1, 1998 (Aug. 1, 1998), XP015008175, abstract paragraph [0003].

(Continued)

*Primary Examiner* — Gary Mui
*Assistant Examiner* — Hooman Houshmand
(74) *Attorney, Agent, or Firm* — Lee & Hayes, P.C.

(57) ABSTRACT

Techniques for Network Address Translation (NAT)-based steering of traffic in cloud-based networks. The techniques may include establishing, by a frontend node of a network, a connection with a client device. The frontend node may receive, via the connection, a packet including an indication of an identity of a service hosted on a backend node of the network. Based at least in part on the indication, the frontend node may establish a second connection with the backend node. Additionally, the frontend node may store a mapping indicating that packets received from the client device are to be sent to the backend node. The techniques may also include receiving another packet at the frontend node or another frontend node of the network. Based at least in part on the mapping, the frontend node or other frontend node may alter one or more network addresses of the other packet and forward it to the backend node.

20 Claims, 7 Drawing Sheets

(56) References Cited

U.S. PATENT DOCUMENTS

2021/0329069 A1* 10/2021 Desmouceaux ...... H04L 67/146
2021/0359954 A1* 11/2021 Mestery ................ H04L 67/146
2021/0392121 A1* 12/2021 Thangapandi ........ H04L 67/148
2023/0025679 A1*  1/2023 Mandeyam ......... H04L 63/1466

OTHER PUBLICATIONS

PCT Search Report and Written Opinion mailed Mar. 3, 2023 for PCT application No. PCT/US2023/010473, 13 pages.
Jeffries, A., et al., "Proposal. for a Network-Friendl.y HTTP Upgrade," draft-tarreau-httpbis-network-friendl.y-00.txt, Internet Society (ISOC) 4, Rue Des Falaises CH-1205 Geneva, Switzerland, Mar. 29, 2012 (Mar. 29, 2012), pp. 1-23, XP015082221, [retrieved on Mar. 29, 2012].
Maltz, D. et al; "TCP Spl.icing for appl.ication l.ayer proxy performance", Journal. of high speed-networks, Jan. 1, 1999 (Jan. 1, 1999), pp. 225-240, Retrieved from the Internet URL:http://www.cs.cmu.edu/-dmal.tz/papers/tcpspl.ice-ibm-tr-21139.pdf, [retrieved on Sep. 14, 2022] paragraphs [0001], [03. 1]- [03. 3].

* cited by examiner

NETWORK ADDRESS TRANSLATION (NAT)-BASED TRAFFIC STEERING

TECHNICAL FIELD

The present disclosure relates generally to techniques for, among other things, utilizing network address translation (NAT)-based proxying with host indicator values to allow for seamless connectivity of clients through the proxy by minimizing issues associated with proxy node disruptions, faults, or going out of rotation.

BACKGROUND

When client devices connect to edge networks there can be an option in the initial ClientHello message for the client to indicate which host it is attempting to connect to. That is, the client can indicate where it wants to connect by including a hostname in this optional field. In network architectures that include a frontend node to proxy or load balance based on host indication values, the frontend node will typically terminate the client connections on the frontend and open equivalent connections on the backend. Data is then typically proxied by being copied across those connections. However, there are cases where this proxying/load balancing can cause problems. For example, because the proxying involves terminating the connection, when a frontend node crashes, the connection is broken, causing the client to have to reconnect. This results in the client creating new connections.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

This disclosure describes various technologies associated with utilizing NAT-based proxying with host indicator values (e.g., Server Name Indicator (SNI) values, Encrypted ClientHello (ECH) values, HTTP host header values, etc.). By way of example, and not limitation, a method according to the technologies described herein may include establishing, by a frontend node of a network, a connection with a client device. The frontend node may receive, via the connection, a packet including a host indicator value that is associated with a service hosted on a backend node of the network. In some examples, the host indicator may comprise at least one of an SNI value or an ECH value associated with the service. Based at least in part on the indication, the frontend node may establish a second connection with the backend node. Additionally, the frontend node may store a mapping indicating that packets received from the client device are to be sent to the backend node. The techniques may also include receiving another packet at the frontend node or another frontend node of the network. Based at least in part on the mapping, the frontend node or other frontend node may alter one or more network addresses of the other packet and forward it to the backend node. Similarly, the frontend node or the other frontend node may receive packets from the backend node that are to be forwarded to the client device, and the frontend node may alter the addresses of the packets to forward them to the client device.

Additionally, the techniques described herein may be performed as a method and/or by a system having non-transitory computer-readable media storing computer-executable instructions that, when executed by one or more processors, performs the techniques described above.

Example Embodiments

As discussed above, in network architectures that include a frontend node to proxy or load balance based on host indicator values (e.g., Server Name Indication (SNI) values, Encrypted ClientHello (ECH) values, HTTP host header values, etc.) the frontend node will typically terminate the client connections on the frontend and open equivalent connections on the backend. Data is then typically proxied by being copied across those connections. However, there are cases where this proxying/load balancing can cause problems. For example, because the proxying involves terminating the connection, when a frontend node crashes, the connection is broken, causing the client to have to reconnect. This results in the client creating new connections. This is less than ideal because the users behind the client device will notice this reconnect. In some cases, these issues can also extend to dynamic scaling of a proxy (e.g., the addition of new frontend nodes into service, the removal of a frontend node from service, etc.) or upgrading of a proxy's code, thereby necessitating a restart.

Accordingly, this disclosure is directed to technologies in which a form of network address translation (NAT) and enhanced host indicator proxying is used to route packets between a frontend and backend of a network, instead of terminating the connections at the frontend node. For example, when a client device attempts to connect, a frontend node (e.g., an SNI proxy node, load balancer, or the like) may initiate the handshake (e.g., establish a Transmission Control Protocol (TCP) connection or other connection) and, from this, the frontend node may receive enough packets in order to extract any unencrypted host information (e.g., SNI value, ECH value, or other host indicator value) from the unencrypted protocol lead-in conversation. In some examples, the frontend node may assign the connection to a backend address and port that is determined based on the host in the stream, and internally associate, as connection/mapping data, the incoming connection with, address, port, and target backend to use. In some examples, the SNI proxy may replay the lead-in conversation to the selected backend node, which initiates the backend connection. In some examples, in the case of TCP connections, the backend connection will likely start with a different sequence number than the frontend connection, and the sequence number adjustment (e.g., offset) may also be noted and added to the connection/mapping data. In some examples, the frontend node may share this connection/mapping data with all other frontend nodes, indicating that packets received for this session on the frontend port should be rewritten to include the selected source address, source port, backend address (e.g., similar to dynamic NAT), or the like. In addition to this conventional NAT behavior, packet sequence numbers may also be adjusted to reflect the expectations of the client or backend node. In some examples, a reverse rule may also be applied indicating that responses should also be adjusted. In this way, only simple packet rewrite rules may be required by the frontend nodes to forward traffic from frontend to backend, as well as from frontend to client. In some examples, these rules may also be shared with the switching fabric and implemented in hardware.

In some examples, if a frontend node (e.g., load balancer, proxy, SNI proxy, etc.) fails, terminates, or is otherwise removed from service and a path within any equal-cost multipath (ECMP) rules is withdrawn—or if a load balancer is added and the ECMP group increases size—then the packets from the client device might be rerouted to a new frontend host node, since ECMP packet hashing may change the next hop in use. However, with the rules installed as described above and herein, this change in ECMP packet hashing has no effect on the connection and it will continue to work precisely as expected, since all frontend nodes are using the above NAT-like rules to rewrite the packet to the correct backend destination. Thus, the connection is no longer vulnerable to changes in the load balancing layer.

By way of example, and not limitation, a method according to the techniques described herein may include establishing, by a frontend node (e.g., host indicator proxy node, SNI proxy node, load balancer, or the like) of a network, a first data flow between the frontend node and a client device. In some examples, the first data flow may be a TCP-based TLS flow, a UDP-based DTLS flow, an IP-based IPsec flow, an HTTP-connect flow, a MASQUE-connect UDP flow, or the like. In some examples, establishing the first data flow/connection may include initiating, by the frontend node, a handshake with the client device.

In some examples, based at least in part on establishing the data flow, the frontend node may receive one or more packets associated with the first data flow sent by the client device. In some examples, the one or more packets may comprise a lead-in conversation that the client device is attempting to have with a service hosted on a backend node of the network. As such, the one or more packets may include a host indicator value associated with the service hosted on the backend node. In some examples, the host indicator value included in the one or more packets may be a server name indication (SNI) value, an encrypted ClientHello (ECH) value, or another host identifier value.

Based at least in part on the host indicator value, the frontend node may make a determination to establish a second data flow between the frontend node and the backend node. Additionally, or alternatively, the frontend node may initiate establishment of the second data flow between itself and the backend node. For instance, the frontend node may forward the one or more packets (e.g., including the lead-in conversation received from the client device) to the backend node. In some examples, the second data flow may be a TCP-based TLS flow, a UDP-based DTLS flow, or the like. In some examples, after the first data flow and the second data flow are established, each of the data flows be terminated.

In some examples, the frontend node may store mapping data (e.g., connection data) indicating that packets of the first data flow are to be sent to the backend node. That is, the mapping data may indicate that packets including a specific network 5-tuple, specific host indicator value, or the like are to be sent to the backend node. In some examples, the mapping data may include network address translation (NAT) data for translating one or more portions of the network 5-tuple in order to send the packets to the backend node. Additionally, in some examples, the mapping data may include a sequence number offset between current TCP sequence numbers of the first data flow and the second data flow. In this way, the sequence numbers of packets received from the first data flow may be offset to correspond with a current sequence number of the second data flow (e.g., a sequence number that the backend node is expecting), and vice versa. In some examples, the frontend node may share the mapping data with other frontend nodes of the network. For instance, the frontend node may send the mapping data to a second frontend node of the network. Additionally, or alternatively, the frontend node may store the mapping data in a database (e.g., key-value store) that is accessible to the other frontend nodes of the network. In this way, if one of the other frontend nodes receives a packet of the first data flow (e.g., due to the original frontend node failing, being removed, change in ECMP hash, or the like), the other frontend node will know how to translate the packets network address in order to send it to the backend node.

In some examples, the frontend node (or any other frontend node) may receive a packet associated with the first data flow and, based at least in part on the mapping, the frontend node may perform a NAT translation on the packet. For instance, the frontend node may alter the packet such that, a source address and/or source port of the packet corresponds with the frontend node (e.g., the frontend node that established the second data flow), a destination address and/or destination port of the packet corresponds with the backend node, or the like. In some examples, the original source address and/or source port of the packet may correspond with the client device, and the original destination address and/or port of the second packet may correspond with the frontend node (e.g., the frontend node that established the first data flow). In addition to performing the NAT translation, in some examples, the frontend node may further alter the packet such that a sequence number of the packet corresponds with a current sequence number of the second data flow. After performing the NAT translation and other alterations on the packet, the frontend node may send the packet to the backend node.

In some examples, a reverse NAT translation and/or packet sequence alteration process may be performed by the frontend node in order to send reply packets from the backend node to the client device. For instance, when a packet is received at the frontend node from the backend node, the frontend node may alter the packet such that the source address and/or source port corresponds with the frontend node, the destination address and/or destination port corresponds with the client device, the TCP sequence number corresponds with a current sequence number of the first data flow, or the like.

According to the techniques disclosed, various improvements in computer-related technology can be realized. For instance, if a frontend node dies or is removed from service—or if a load balancer is added and the ECMP group increases size—then the packets from the client device might be rerouted to a new frontend node, since ECMP packet hashing may change the next hop in use. However, with the rules installed as described above and herein, this change in ECMP packet hashing has no effect on the connection and it will continue to work precisely as expected, since all frontend nodes are using NAT-like rules to rewrite the packet to the correct backend destination. Thus, the connection is no longer vulnerable to changes in network load balancing layers. Additionally, the disclosed techniques enable the ability to load-balance/proxy using a Layer 7 context while performing a Layer 3-style load-balancing/proxying. Furthermore, the techniques describe performing a simple form of NAT, without the need for data flow termination on each end of the frontend node, which allows for a transparent pass through of packets from frontend to backend. In other words, instead of terminating and forwarding a connection (a process which involves significant compute including stream reassembly and disassembly), the disclosed techniques describe manipulating packets to forward them between frontend and backend (a process which does not involve significant compute and can be done much faster).

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1A:
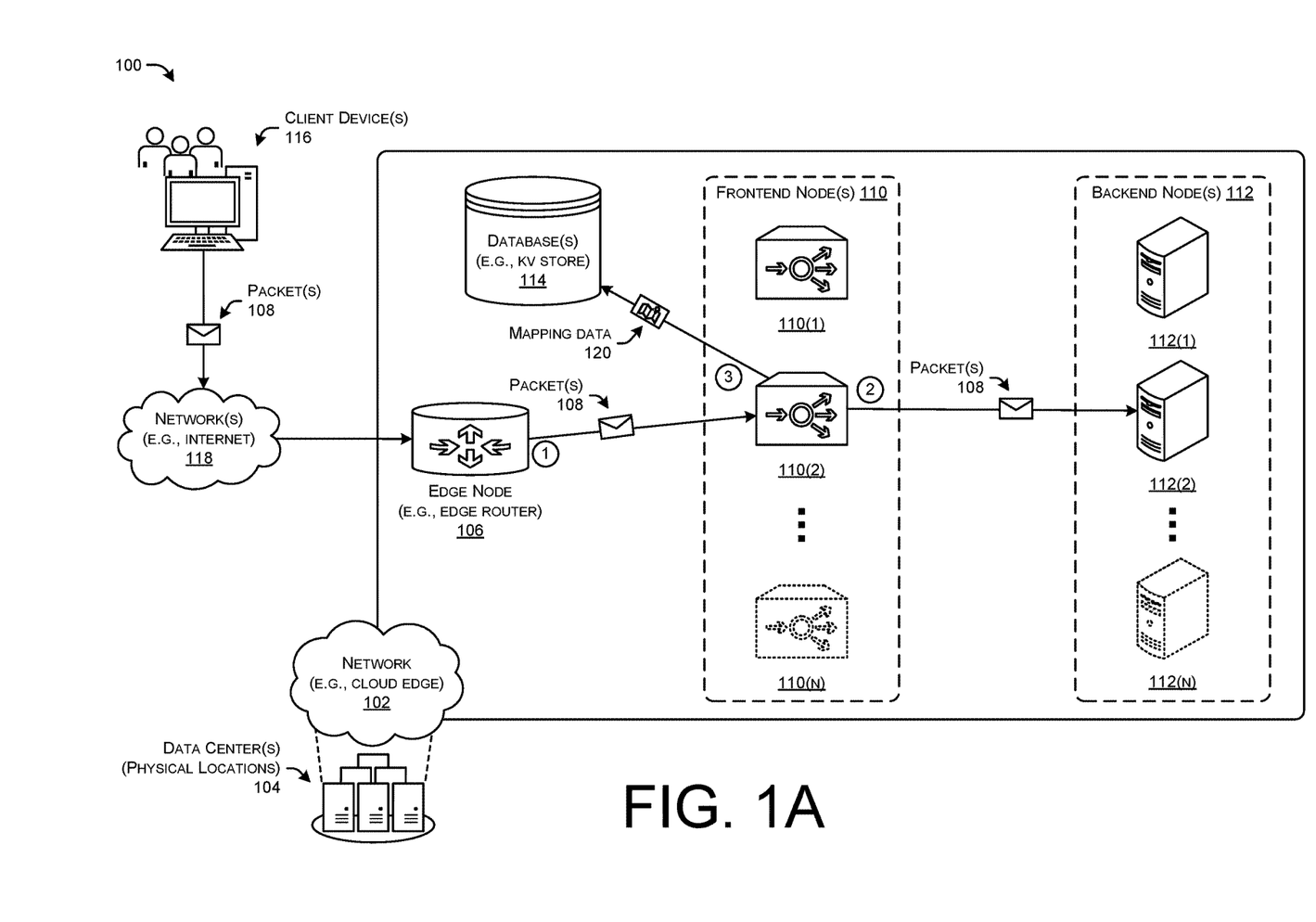
FIG. 1A illustrates an example architecture that may be used to implement various aspects of the NAT-based traffic steering techniques described herein.
Figure 1B:
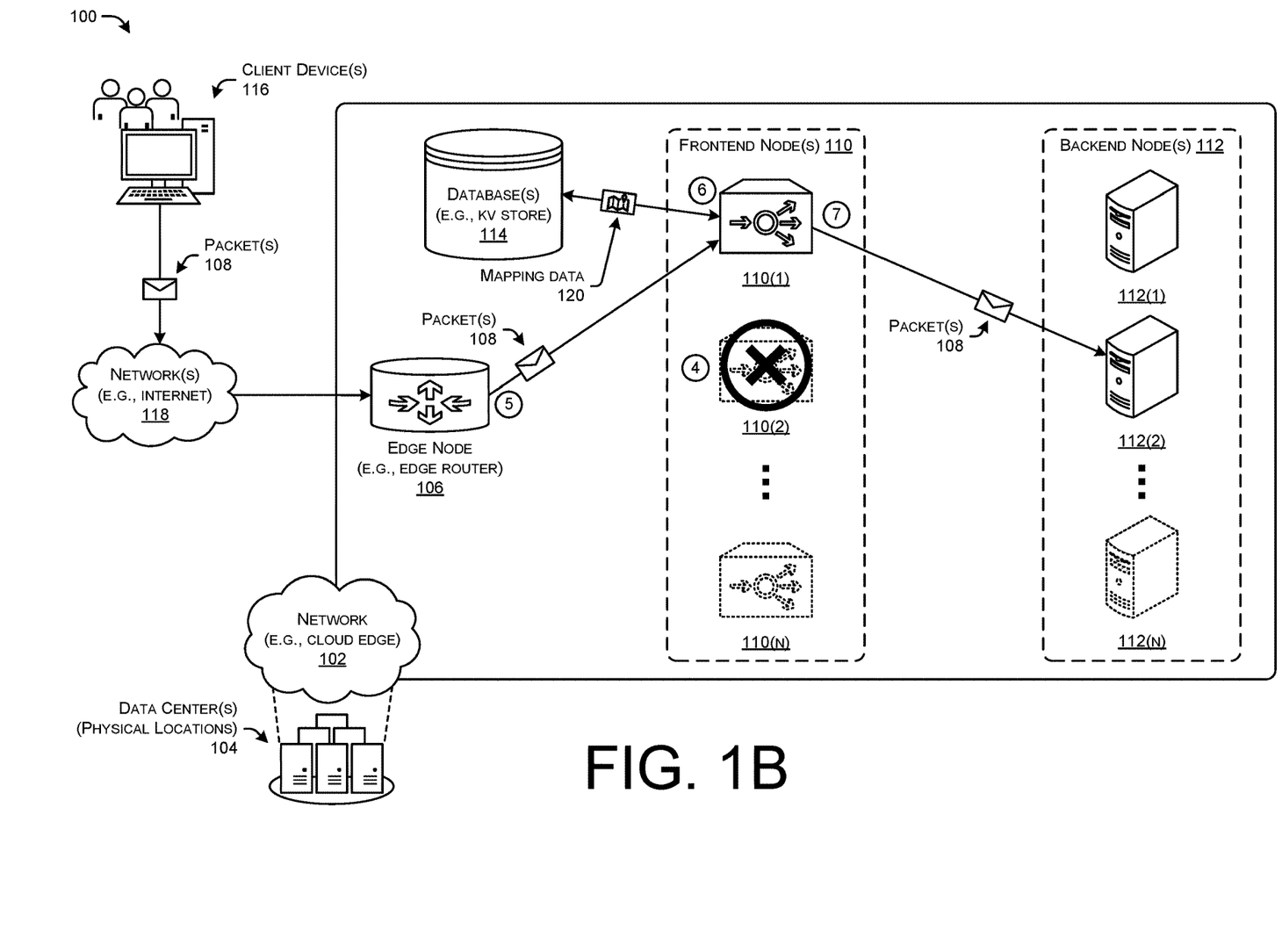
FIG. 1B illustrates another example architecture that may be used to implement various aspects of the NAT-based traffic steering techniques described herein.

FIGS. 1A and 1B collectively illustrate an example architecture 100 that may be used to implement various aspects of the NAT-based traffic steering techniques described herein. The network 102 may represent an cloud-based network, a cloud edge network, a cloud edge datacenter, or the like, or any other type of network. In examples, the network 102 and the devices associated with the network 102 may be located within one or more data center(s) 104. The one or more data center(s) 104 may be physical facilities or buildings located across geographic areas that are designated to store computing resources. The data center(s) 104 may include various networking devices, as well as redundant or backup components and infrastructure for power supply, data communication connections, environmental controls, internet-of-things devices, services, and various security devices. In some examples, the data center(s) 104 may include one or more virtual data centers which are a pool or collection of cloud infrastructure resources specifically designed for enterprise needs, and/or for cloud-based service provider needs. Generally, the data center(s) 104 (physical and/or virtual) may provide basic resources such as processor (CPU), memory (RAM), storage (disk), networking (bandwidth), security, and the like. However, in some examples the devices of the network 102 may not be located in explicitly defined data center(s) 104 but may be located in other locations or buildings.

The network 102 architecture represents a two-layer load balancer model, in which the edge node 106 (e.g., first load balancer layer) uses a first load balancing algorithm (e.g., ECMP) to distribute packet(s) 108 to one or more frontend node(s) 110 (e.g., second load balancing layer). In some examples, the network 102 may include multiple edge nodes 106. Additionally, the frontend node(s) 110 of the network 102 may be scalable (e.g., with demand) to include a first frontend node 110(1), a second frontend node 110(2), . . . , and an Nth frontend node 110(N) (where "N" can represent any number greater than or equal to 1). In some examples, the frontend node(s) 110 may be routers, switches, servers, load balancers, or other physical and/or virtual computing devices. The network 102 may also include a scalable pool of backend node(s) 112, including a first backend node 112(1), a second backend node 112(2), and an Nth backend node 112(N). In some examples, the backend node(s) 112 may be server devices that are capable of hosting one or more services. Additionally, the network 102 may also include one or more database(s) 114, such as a key-value (KV) store.

In some examples, the client device(s) 116 may connect to and send one or more packet(s) 108 to the network 102 via one or more other network(s) 118, such as the internet, a wide-area network (WAN), or the like. The packet(s) 108 may be first received at the edge node 106 (e.g., datacenter edge router) of the network 102. At "1," the edge node 106 may use a load balancing algorithm (e.g., ECMP, or the like) and determine to send the packet(s) 108 to the frontend node 110(2). In some examples, if the packet(s) 108 include a request to connect, the frontend node 110(2) may establish a connection (e.g., TCP connection, UDP connection, Ip connection, or other data flow) with the client device(s) 116. In some examples, the frontend node 110(2) may receive enough of the packet(s) 108 from the client device(s) 116 in order to determine which backend node 112 that the client device(s) 116 is attempting to connect with. For instance, the frontend node 110(2) may continue a lead-in conversation with the client device(s) 116 until a host indicator value, such as an SNI value or ECH value, is received.

Once the host indicator is received, the frontend node 110(2) may make a determination as to which one of the backend node(s) 112 that the client device(s) 116 is to connect with (in the case of FIG. 1A, the backend node 112(2)). Based at least in part on making this determination, the frontend node 110(2) may, at "2," forward the one or more packet(s) 108 to the backend node 112(2). Because the one or more packet(s) 108 include the lead-in conversation, receipt of the one or more packet(s) 108 may prompt the backend node 112(2) to establish a connection with the frontend node 110(2).

In some examples, the frontend node 110(2) may, as shown in step "3," store mapping data 120 (e.g., connection data) in the one or more database(s) 114. For instance, the mapping data 120 may indicate that the packet(s) 108 that include a specific network 5-tuple (e.g., corresponding with the specific client device 116 and specific frontend node 110(2)) and SNI/ECH value are to be sent to the backend node 112(2). In some examples, the mapping data 120 may also include a TCP sequence number offset between the first connection (e.g., between the client device(s) 116 and the frontend node 110(2)) and the second connection (e.g., between the frontend node 110(2) and the backend node 112(2)). Since the database(s) 114 may be accessible to each one of the frontend node(s) 110, the frontend node(s) 110 may obtain the mapping data 120 from the database(s) 114, if necessary.

Turning to FIG. 1B, at "4," the frontend node 110(2) fails or is removed from the network 102. Due to this, the edge node 106 may, at "5," send the packet(s) 108 to the frontend node 110(1). For instance, a hashing algorithm may have changed due to the removal of the frontend node 110(2) from the hashing algorithm, and the edge node 106 may make a determination to send the packet(s) 108 to the frontend node 110(1).

At "6," based at least in part on receiving the packet(s) 108, the frontend node 110(1) may obtain the mapping data 120 from the database(s) 114. In other examples, the frontend node 110(1) may have the mapping data 120 stored locally and may not need to consult the database(s) 114. Based at least in part on the mapping data 120, the frontend node 110(1) may make a determination to send the packet(s) 108 to the backend node 112(2).

At "7," the frontend node 110(1) may utilize the mapping data 120 to perform a NAT translation with respect to one or more network addresses included in the packet(s) 108, as well as, in some examples, adjusting a sequence number of the packet(s) 108 to match a current sequence number that will be expected by the backend node 112(2). After making these alterations to the packet(s) 108, the frontend node 110(1) may forward the packet(s) 108 to the backend node 112(2).

Figure 2:
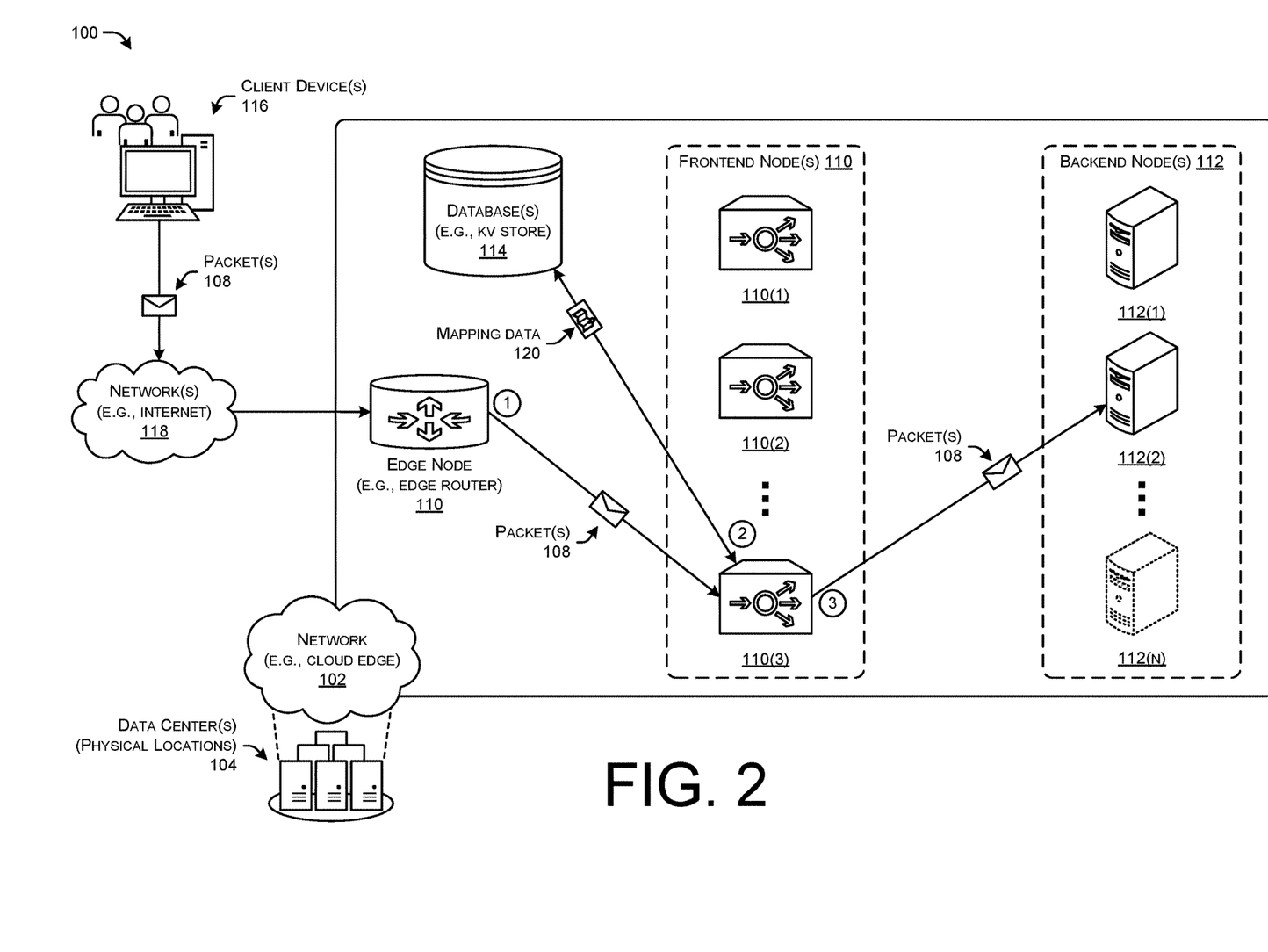
FIG. 2 illustrates steps of an example NAT-based traffic steering process that may be performed by the architecture when a new frontend node is brought online.

FIG. 2 illustrates steps of an example NAT-based traffic steering process that may be performed by the architecture 100 when a new frontend node 110(3) is brought online. Based at least in part on the addition of the new frontend node 110(3) to the pool of frontend node(s) 110, a result of a hashing algorithm used by the edge node 110 to load balance the packet(s) 108 may be changed. Due to this, the edge node 106 may, at "1," send the packet(s) 108 to the frontend node 110(3) (or any other one of the frontend node(s) 110).

At "2," based at least in part on receiving the packet(s) 108, the frontend node 110(3) may obtain the mapping data 120 from the database(s) 114. Based at least in part on the mapping data 120, the frontend node 110(3) may make a determination to send the packet(s) 108 to the backend node 112(2).

At "3," the frontend node 110(3) may utilize the mapping data 120 to perform a NAT translation with respect to one or more network addresses included in the packet(s) 108, as well as, in some examples, adjusting a sequence number of the packet(s) 108 to match a current sequence number that will be expected by the backend node 112(2). After making these alterations to the packet(s) 108, the frontend node 110(3) may forward the packet(s) 108 to the backend node 112(2).

Figure 3:
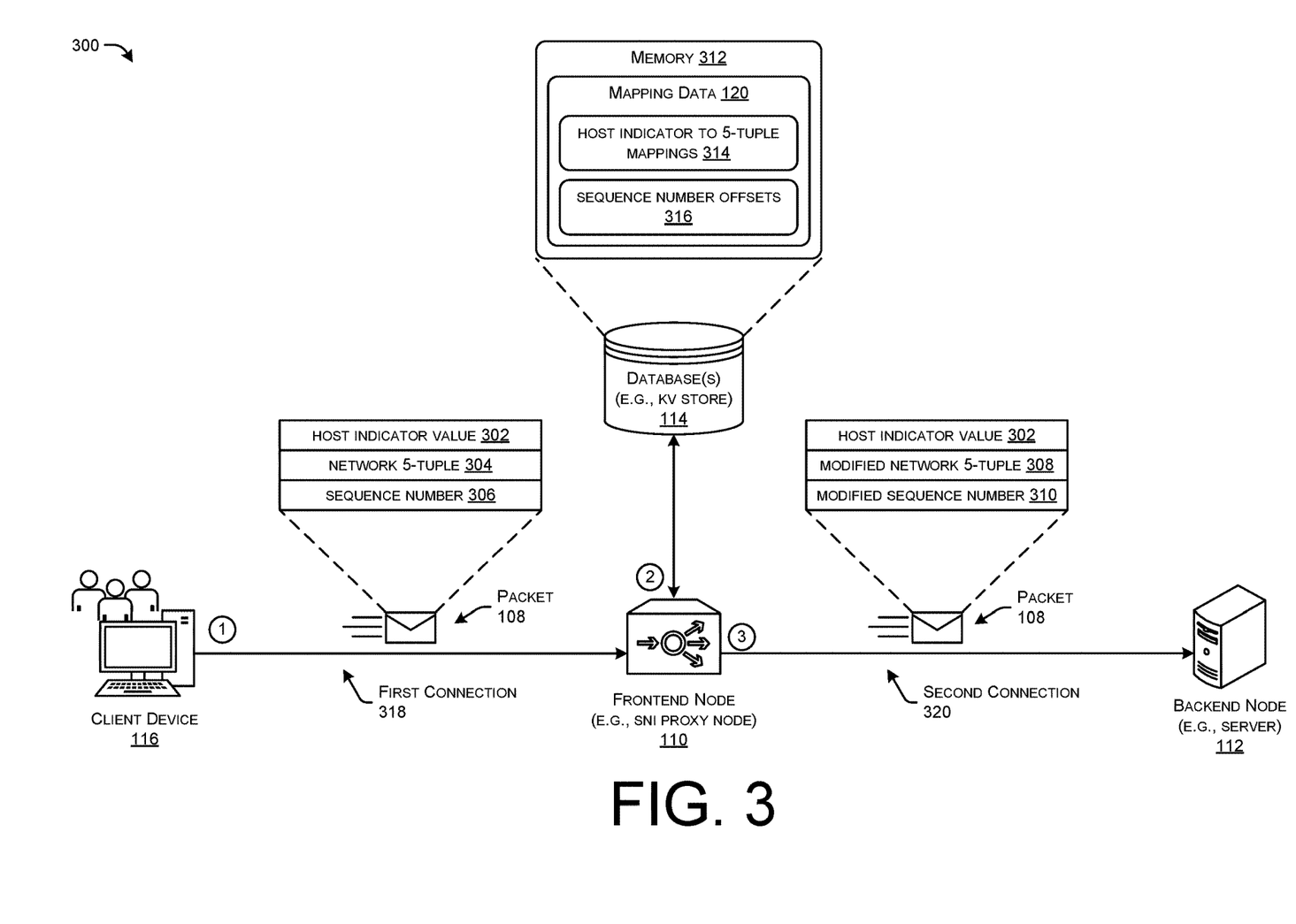
FIG. 3 illustrates an example in which a frontend node modifies a packet according to the NAT-based traffic steering techniques described herein.

FIG. 3 illustrates an example flow 300 in which a frontend node 110 modifies a packet 108 according to the NAT-based traffic steering techniques described herein. As shown, the frontend node 110 may comprise an SNI proxy node and the backend node 112 may comprise a server. In some examples, the client device 116 may comprise a computer, personal computer, laptop, mobile device (e.g., cell phones, tablets, etc.), router, or the like.

At "1," the client device 116 may send the packet 108 to the frontend node 110. The packet 108 may include an host indicator value 302, a network 5-tuple, and a sequence number 306. In some examples, the host indicator value 302 may be an SNI value, ECH value, or the like that is indicative of a hostname of a specific service (e.g., website, application, etc.) that is hosted on the backend node 112. In some examples, the host indicator value 302 may be indicative of an identity of the backend node 112. The network 5-tuple 304 may include an indication of a source port of the client device 116, source IP address of the client device 116, destination port of the frontend node 110, destination IP address of the frontend node 110, and a protocol of the packet 108 (e.g., TCP, UDP, IP (TLS, DTLS, IPsec, and other session protocols that may be built on top of a lower layer protocol)). In some examples, the packet 108 may also include the sequence number 306 (e.g., TCP sequence number). The sequence number 306 may be specific to the first connection 318.

At "2," the frontend node 110 may receive the packet and obtain mapping data 120 from the database(s) 114. In some examples, the frontend node 110 may obtain the mapping data 120 from the database(s) 114 if the frontend node 110 is not already storing the mapping data 120 in its own local memory. The database(s) 114 may include memory 312 that stores the mapping data 120. The mapping data 120 may include host indicator to 5-tuple mappings 314, as well as sequence number offsets. When the frontend node 110 obtains the mapping data 120 from the database(s) 114, the frontend node 110 may obtain a host indicator to 5-tuple mapping and/or a sequence number offset that is specific to packets of the first connection 318 and the second connection 320. In some examples, the first connection 318 and the second connection 320 are separate TLS/TCP flows, DTLS/UDP flows, IPsec/IP flows, or other dataflows. In some examples, the frontend node 110 may communicate with (e.g., send one or more packets to and/or receive one or more packets from) the database(s) 114 to obtain the mapping data 120.

Using the mapping data 120, the frontend node 110 may perform a NAT translation of the network 5-tuple 304 such that the packet 108 includes a modified network 5-tuple 308. For instance, the frontend node 110 may re-write the network 5-tuple 304 of the packet 108 such that the modified network 5-tuple 308 includes an indication of a source port of the frontend node 110 (instead of the client device 116), a source IP address of the frontend node 110 (instead of the client device 116), a destination port of the backend node 112 (instead of the frontend node 110), and/or a destination IP address of the backend node 112 (instead of the frontend node 110). In some examples, the NAT translation performed by the frontend node 110 may only alter a portion of the network 5-tuple 304 (e.g., one or more of the source address, the source port, the destination port, or the destination address). Additionally, in some examples, the frontend node 110 may alter the sequence number 306 based at least in part on the mapping data 120 such that the packet 108 includes the modified sequence number 310. In some examples, a difference between the sequence number 306 and the modified sequence number 310 may be equal to the sequence number offset between the first connection 318 and the second connection 320 stored in the mapping data 120.

At "3," the frontend node 110 may send the packet 108 to the backend node 112. As noted above, the packet 108 that is send to the backend node 112 via the second connection 320 may include the host indicator value 302, the modified network 5-tuple 308, and the modified sequence number 310.

In some examples, a similar, reverse process to the flow 300 may be performed by the frontend node 110 to forward response packets back to the client device 116 from the backend node 112. For instance, the frontend node 110 may receive a response packet, perform a NAT translation and/or sequence number offset, and forward the response packet to the client device 116. For instance, the frontend node 110 may re-write a network 5-tuple of the response packet such to include an indication of a source port of the frontend node 110 (instead of the backend node 112), a source IP address of the frontend node 110 (instead of the backend node 112), a destination port of the client device 116 (instead of the frontend node 110), and/or a destination IP address of the client device 116 (instead of the frontend node 110). Additionally, in some examples, the frontend node 110 may alter a sequence number of the response packet such that the response packet includes a modified sequence number that corresponds with a current sequence number expected by the client device.

Figure 4:
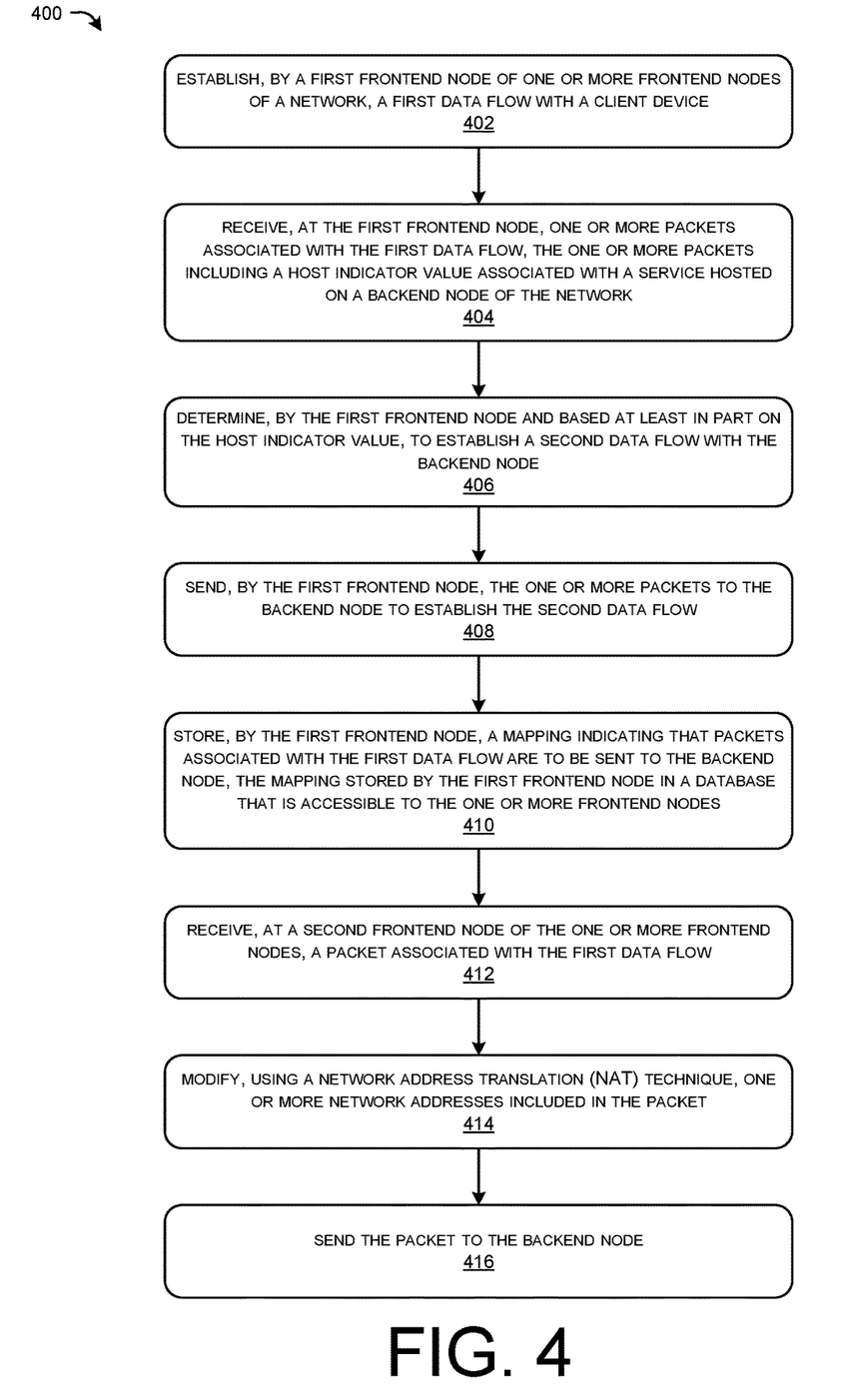
FIG. 4 is a flow diagram illustrating an example method associated with the NAT-based traffic steering techniques described herein.

FIG. 4 is a flow diagram illustrating an example method 400 associated with the NAT-based traffic steering techniques described herein. The logical operations described herein with respect to FIG. 4 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 4 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

The method 400 begins at operation 402, which includes establishing, by a first frontend node of one or more frontend nodes of a network, a first data flow with a client device. For instance, the frontend node 110(2) may establish a first data flow with one of the client device(s) 116. The first data flow may be a first TLS flow, DTLS flow, TCP flow, UDP flow, or the like.

At operation 404, the method 400 includes receiving, at the first frontend node, one or more packets associated with the first data flow, the one or more packets including a host indicator value associated with a service hosted on a backend node of the network. For instance, the frontend node 110(2) may receive the one or more packet(s) 108 associated with the first data flow. Additionally, in some instance, the one or more packet(s) may include a host indictor associated with a service that is hosted on the backend node 112(2) of the network 102.

At operation 406, the method 400 includes determining, by the first frontend node and based at least in part on the host indicator value, to establish a second data flow with the backend node. For instance, the frontend node 110(2) may determine to establish the second data flow between itself and the backend node 112(2).

At operation 408, the method 400 includes sending, by the first frontend node, the one or more packets to the backend node to establish the second data flow. In some examples, the frontend node 110(2) may send the one or more packet(s) 108 to the backend node 112(2) to establish the second data flow. For instance, the one or more packet(s) 108 may include a lead-in conversation that may prompt the backend node 112(2) to establish the connection.

At operation 410, the method 400 includes storing, by the first frontend node, a mapping indicating that packets associated with the first data flow are to be sent to the backend node, the mapping stored by the first frontend node in a database that is accessible to the one or more frontend nodes. For instance, the frontend node 110(2) may store the mapping data 120 indicating that packet(s) 108 associated with the first data flow are to be sent to the backend node 112(2). The mapping data 120 may be stored in one or more database(s) 114 that are accessible to the other frontend node(s) 110.

At operation 412, the method 400 includes receiving, at a second frontend node of the one or more frontend nodes, a packet associated with the first data flow. For instance, the frontend node 110(1) may receive the packet of the first data flow. In some examples, the second frontend node may receive the packet of the first data flow based at least in part on the first frontend node failing, being removed from service, an addition of another frontend node, or the like.

At operation 414, the method 400 includes modifying, using a network address translation (NAT) technique, one or more network addresses included in the packet. For instance, the frontend node 110(1) may modify the packet using a NAT technique. In some examples, the second frontend node may modify the packet based at least in part on the mapping data. For instance, the second frontend node may obtain the mapping data from a key-value store in response to receiving the packet. In some examples, the second frontend node may modify a sequence number of the packet. At operation 416, the method 400 includes sending the packet to the backend node. For instance, the frontend node 110(1) may send the modified packet to the backend node 112(1).

Figure 5:
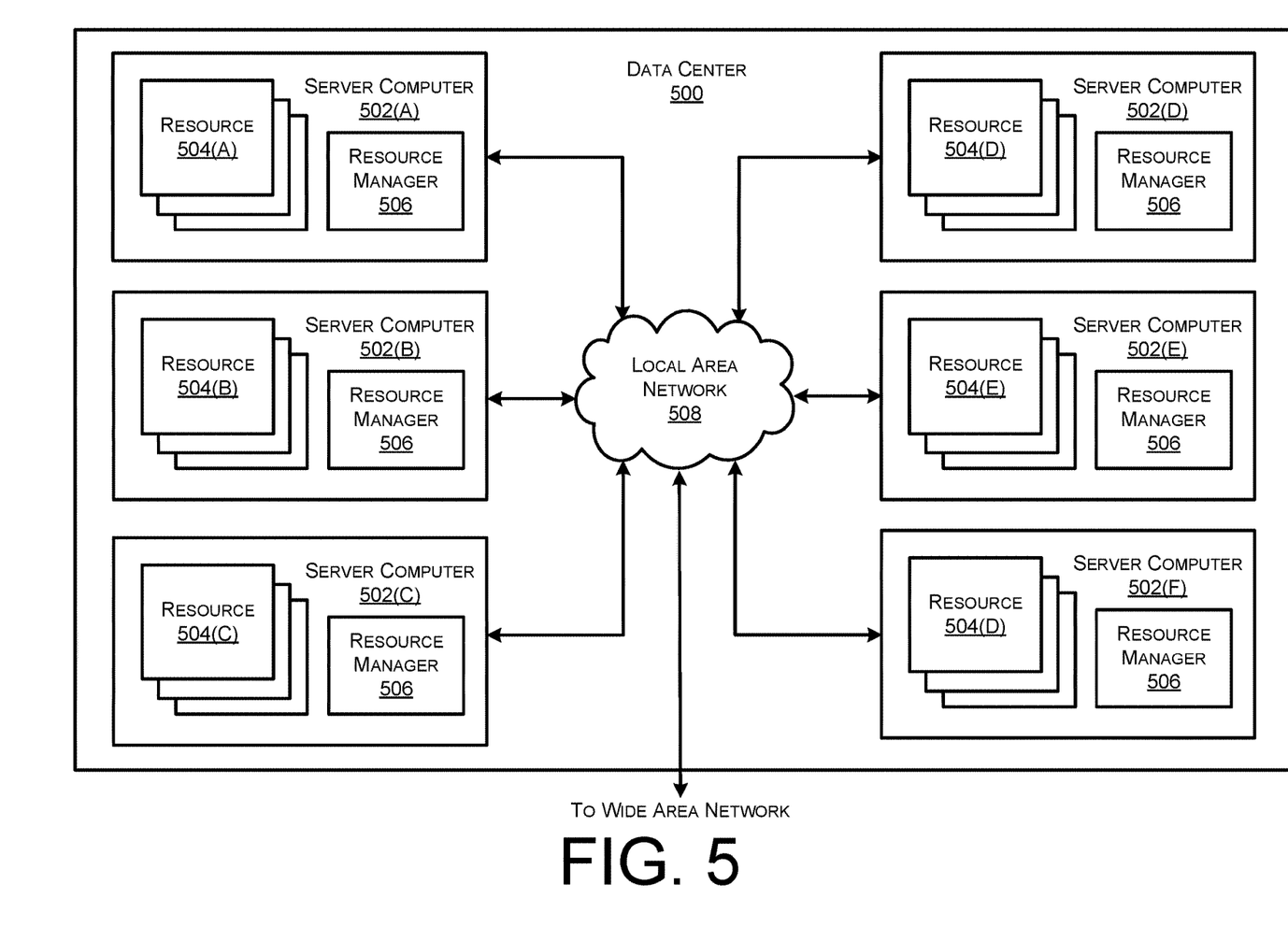
FIG. 5 is a computing system diagram illustrating an example configuration of a data center that can be utilized to implement aspects of the technologies disclosed herein.

FIG. 5 is a computing system diagram illustrating an example configuration of a data center 500 that can be utilized to implement aspects of the technologies disclosed herein. The example data center 500 shown in FIG. 5 includes several server computers 502A-502F (which might be referred to herein singularly as "a server computer 502" or in the plural as "the server computers 502") for providing computing resources. In some examples, the resources and/or server computers 502 may include, or correspond to, any type of networked device or node described herein. Although described as servers, the server computers 502 may comprise any type of networked device, such as servers, switches, routers, hubs, bridges, gateways, modems, repeaters, access points, etc.

The server computers 502 can be standard tower, rack-mount, or blade server computers configured appropriately for providing computing resources. In some examples, the server computers 502 may provide computing resources 504 including data processing resources such as VM instances or hardware computing systems, database clusters, computing clusters, storage clusters, data storage resources, database resources, networking resources, security, packet inspection, and others. Some of the servers 502 can also be configured to execute a resource manager 506 capable of instantiating and/or managing the computing resources. In the case of VM instances, for example, the resource manager 506 can be a hypervisor or another type of program configured to enable the execution of multiple VM instances on a single server computer 502. Server computers 502 in the data center 500 can also be configured to provide network services and other types of services.

In the example data center 500 shown in FIG. 5, an appropriate local area network (LAN) 508 is also utilized to interconnect the server computers 502A-502F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 500, between each of the server computers 502A-502F in each data center 500, and, potentially, between computing resources in each of the server computers 502. It should be appreciated that the configuration of the data center 500 described with reference to FIG. 5 is merely illustrative and that other implementations can be utilized.

In some examples, the server computers 502 may each execute one or more application containers and/or virtual machines to perform techniques described herein. In some instances, the data center 500 may provide computing resources, like application containers, VM instances, and storage, on a permanent or an as-needed basis. Among other types of functionality, the computing resources provided by a cloud computing network may be utilized to implement the various services and techniques described above. The computing resources 504 provided by the cloud computing network can include various types of computing resources, such as data processing resources like application containers and VM instances, data storage resources, networking resources, data communication resources, network services, and the like.

Each type of computing resource 504 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 504 not mentioned specifically herein.

The computing resources 504 provided by a cloud computing network may be enabled in one embodiment by one or more data centers 500 (which might be referred to herein singularly as "a data center 500" or in the plural as "the data centers 500"). The data centers 500 are facilities utilized to house and operate computer systems and associated components. The data centers 500 typically include redundant and backup power, communications, cooling, and security systems. The data centers 500 can also be located in geographically disparate locations. One illustrative embodiment for a data center 500 that can be utilized to implement the technologies disclosed herein will be described below with regard to FIG. 6.

Figure 6:
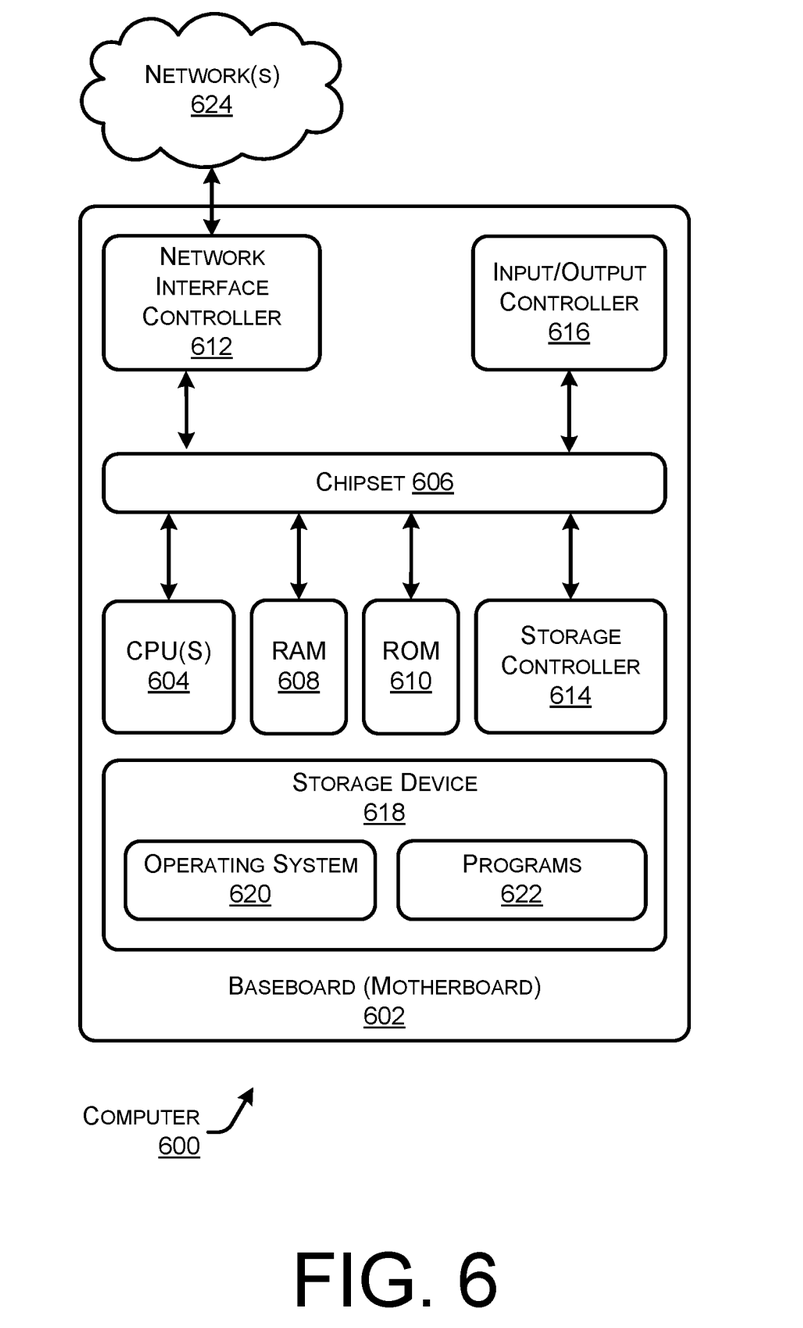
FIG. 6 is a computer architecture diagram showing an illustrative computer hardware architecture for implementing a computing device that can be utilized to implement aspects of the various technologies presented herein.

FIG. 6 is a computer architecture diagram showing an illustrative computer hardware architecture for implementing a computing device that can be utilized to implement aspects of the various technologies presented herein. The computer architecture shown in FIG. 6 illustrates a conventional server computer, network node (e.g., frontend node or backend node), router, workstation, desktop computer, laptop, tablet, network appliance, e-reader, smartphone, load balancer, or other computing device, and can be utilized to execute any of the software components presented herein.

The computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 600. The chipset 606 can further provide an interface to a computer-readable storage medium such as a read-only memory ("ROM") 610 or non-volatile RAM ("NVRAM") for storing basic routines that help to startup the computer 600 and to transfer information between the various components and devices. The ROM 610 or NVRAM can also store other software components necessary for the operation of the computer 600 in accordance with the configurations described herein.

The computer 600 can operate in a networked environment using logical connections to remote computing devices and computer systems through a network, such as the network 102 or the network(s) 118. The chipset 606 can include functionality for providing network connectivity through a NIC 612, such as a gigabit Ethernet adapter. The NIC 612 is capable of connecting the computer 600 to other computing devices over the network 624 and/or network 102. It should be appreciated that multiple NICs 612 can be present in the computer 600, connecting the computer to other types of networks and remote computer systems. In some examples, the NIC 612 may be configured to perform at least some of the techniques described herein.

The computer 600 can be connected to a storage device 618 that provides non-volatile storage for the computer. The storage device 618 can store an operating system 620, programs 622, and data, which have been described in greater detail herein. The storage device 618 can be connected to the computer 600 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computer 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the storage device 618 by detecting the physical states or characteristics of one or more particular locations within the physical storage units.

In addition to the mass storage device 618 described above, the computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 600. In some examples, the operations performed by the architecture 100 and or any components included therein, may be supported by one or more devices similar to computer 600. Stated otherwise, some or all of the operations performed by the architecture 100, and or any components included therein, may be performed by one or more computer devices 600 operating in a scalable arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computer 600. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the computer 600.

In one embodiment, the storage device 618 or other computer-readable storage media is encoded with computer-executable instructions which, when loaded into the computer 600, transform the computer from a general-purpose computing system into a special-purpose computer capable of implementing the embodiments described herein. These computer-executable instructions transform the computer 600 by specifying how the CPUs 604 transition between states, as described above. According to one embodiment, the computer 600 has access to computer-readable storage media storing computer-executable instructions which, when executed by the computer 600, perform the various processes and functionality described above with regard to FIGS. 1-5, and herein. The computer 600 can also include computer-readable storage media having instructions stored thereupon for performing any of the other computer-implemented operations described herein.

The computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computer 600 might not include all of the components shown in FIG. 6, can include other components that are not explicitly shown in FIG. 6, or might utilize an architecture completely different than that shown in FIG. 6.

The computer 600 may include one or more hardware processors (processors) configured to execute one or more stored instructions. The processor(s) may comprise one or more cores. Further, the computer 600 may include one or more network interfaces configured to provide communications between the computer 600 and other devices. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 622 may comprise any type of programs or processes to perform the techniques described in this disclosure for NAT-based proxying with SNI/ECH values to allow for seamless connectivity of clients through the proxy by minimizing issues associated with proxy node disruptions, faults, or going out of rotation. For instance, the programs 622 may include a program to perform NAT translations on packets, to offset sequence numbers, or the like.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   establishing, by a frontend node of a network, a first data flow between the frontend node and a client device, wherein the first data flow is at least partly established by an edge node of the network provisioned between the frontend node and the client device;

receiving, at the frontend node, a first packet associated with the first data flow, the first packet including a host indicator value associated with a service hosted on a backend node of the network;

based at least in part on the host indicator value, establishing, by the frontend node, a second data flow between the frontend node and the backend node;

storing, by the frontend node, a mapping indicating that packets associated with the first data flow are to be sent to the backend node;

receiving, at the frontend node, a second packet associated with the first data flow;

based at least in part on the mapping, altering, by the frontend node, the second packet such that, at least:
- a source address of the second packet corresponds with the frontend node; and
- a destination address of the second packet corresponds with the backend node; and sending, by the frontend node, the second packet to the backend node.

2. The method of claim 1, wherein the host indicator value included in the first packet comprises at least one of a Server Name Indication (SNI) value, an Encrypted ClientHello (ECH) value, or a Hypertext Transfer Protocol (HTTP) host header value associated with the service.

3. The method of claim 1, wherein, prior to altering the second packet:
the source address of the second packet corresponds with the client device, and
the destination address of the second packet corresponds with the frontend node.

4. The method of claim 1, further comprising altering, by the frontend node, a TCP sequence number of the second packet based at least in part on a difference between TCP sequence numbers of the first data flow and of the second data flow.

5. The method of claim 1, wherein the second packet is further altered by the frontend node such that a source port of the second packet corresponds with the frontend node.

6. The method of claim 1, wherein:
the first data flow is at least one of a first TCP flow or a first UDP flow, and
the second data flow is at least one of a second TCP flow or a second UDP flow.

7. The method of claim 1, wherein the frontend node is a first frontend node and the mapping is stored by the first frontend node in a database that is accessible to at least a second frontend node of the network that is different from the first frontend node.

8. The method of claim 7, further comprising:
receiving, at the second frontend node, a third packet of the first data flow, wherein the third packet is received at the second frontend node based at least in part on at least one of a failure of the first frontend node or a removal of the first frontend node from the network;
determining, by the second frontend node and based at least in part on the mapping, to alter the third packet such that, at least:
- a source address of the third packet corresponds with the first frontend node; and
- a destination address of the third packet corresponds with the backend node; and
sending, by the second frontend node, the third packet to the backend node.

9. The method of claim 1, further comprising:
receiving, at the frontend node and from the backend node, a third packet of the second data flow;
altering, by the frontend node, the third packet such that, at least:
- a source address of the third packet corresponds with the frontend node; and
- a destination address of the third packet corresponds with the client device; and
sending, by the frontend node, the third packet to the client device.

10. The method of claim 9, wherein:
the mapping further indicates that packets of the second data flow are to be sent to the client device, and
the third packet is altered based at least in part on the mapping.

11. A frontend node of a network, the frontend node comprising:
one or more processors; and
one or more non-transitory computer-readable media storing instructions that, when executed, cause the frontend node to perform operations comprising:
establishing a first data flow between the frontend node and a client device, wherein the first data flow is at least partly established by an edge node of the network that is provisioned between the frontend node and the client device;
receiving a first packet associated with the first data flow, the first packet including a host indicator value associated with a service hosted on a backend node of the network;
establishing a second data flow between the frontend node and the backend node based at least in part on the first packet including the host indicator value;
storing a mapping indicating that packets associated with the first data flow are to be sent to the backend node;
receiving a second packet associated with the first data flow;
based at least in part on the mapping, altering the second packet such that, at least:
- a source address of the second packet corresponds with the frontend node; and
- a destination address of the second packet corresponds with the backend node; and
sending the second packet to the backend node.

12. The frontend node of claim 11, wherein the host indicator value comprises at least one of a Server Name Indication (SNI) value, an Encrypted ClientHello (ECH) value, or a Hypertext Transfer Protocol (HTTP) host header value associated with the service.

13. The frontend node of claim 11, wherein, prior to altering the second packet:
the source address of the second packet corresponds with the client device, and
the destination address of the second packet corresponds with the frontend node.

14. The frontend node of claim 11, the operations further comprising altering a TCP sequence number of the second packet based at least in part on a difference between TCP sequence numbers of the first data flow and of the second data flow.

15. The frontend node of claim 11, wherein the frontend node is a first frontend node and the mapping is stored by the first frontend node in a database that is accessible to at least a second frontend node of the network that is different from the first frontend node.

16. The frontend node of claim 11, the operations further comprising:
receiving, from the backend node, a third packet of the second data flow;
altering the third packet such that, at least:
a source address of the third packet corresponds with the frontend node; and
a destination address of the third packet corresponds with the client device; and
sending the third packet to the client device.

17. The frontend node of claim 11, wherein:
the first data flow is at least one of a first TCP flow or a first UDP flow, and
the second data flow is at least one of a second TCP flow or a second UDP flow.

18. One or more non-transitory computer-readable media storing instructions that, when executed by one or more processors, cause the one or more processors to perform operations comprising:
establishing, by a first frontend node of one or more frontend nodes of a network, a first data flow with a client device, wherein the first data flow is at least partly established by an edge node of the network that is provisioned between the frontend node and the client device;
receiving, at the first frontend node, one or more packets associated with the first data flow, the one or more packets including a host indicator value that is associated with a service hosted on a backend node of the network, the host indicator value comprising at least one of a server name indication (SNI) value, an encrypted ClientHello (ECH) value, or a Hypertext Transfer Protocol (HTTP) host header value;
determining, by the first frontend node and based at least in part on the host indicator value, to establish a second data flow with the backend node;
sending, by the first frontend node, the one or more packets to the backend node to establish the second data flow;
storing, by the first frontend node, a mapping indicating that packets associated with the first data flow are to be sent to the backend node, the mapping stored by the first frontend node in a database that is accessible to the one or more frontend nodes;
receiving, at a second frontend node of the one or more frontend nodes, a packet associated with the first data flow;
based at least in part on the mapping, altering, by the second frontend node, the packet such that, at least:
a source address of the packet corresponds with the first frontend node;
a destination address of the packet corresponds with the backend node; and
a packet sequence number of the packet corresponds with a current packet sequence number of the second data flow; and
sending, by the second frontend node, the packet to the backend node.

19. The one or more non-transitory computer-readable media of claim 18, wherein, prior to altering the packet:
the source address corresponds with the client device,
the destination address corresponds with the one or more frontend nodes, and
the packet sequence number corresponds with a current packet sequence number of the first data flow.

20. The one or more non-transitory computer-readable media of claim 18, wherein:
the first data flow is at least one of a first TCP flow or a first UDP flow, and
the second data flow is at least one of a second TCP flow or a second UDP flow.

* * * * *